United States Patent [19]
Morgan

[11] 3,722,133
[45] Mar. 27, 1973

[54] GAME CALL
[76] Inventor: James K. Morgan, P.O. Box 688, Jackson, La. 70748
[22] Filed: Mar. 8, 1972
[21] Appl. No.: 232,709

[52] U.S. Cl................................46/178, 46/180
[51] Int. Cl..................................A63h 5/00
[58] Field of Search...................46/178, 180, 182

[56] References Cited
UNITED STATES PATENTS
2,560,895   7/1951   Roth........................................46/180
2,833,086   5/1958   Johenniing...............................46/180

Primary Examiner—Louis G. Mancene
Assistant Examiner—Robert F. Cutting
Attorney—William David Kiesel

[57] ABSTRACT

A call for imitating the sound of wild game having a resilient sound producing membrane in combination with two different sound controlling means.

6 Claims, 4 Drawing Figures

PATENTED MAR 27 1973 3,722,133
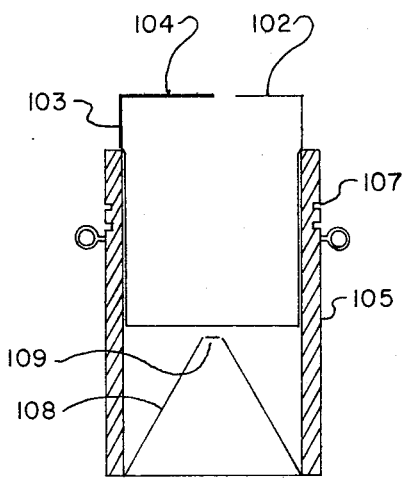
FIG. III
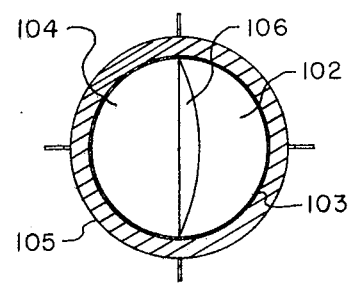
FIG. II
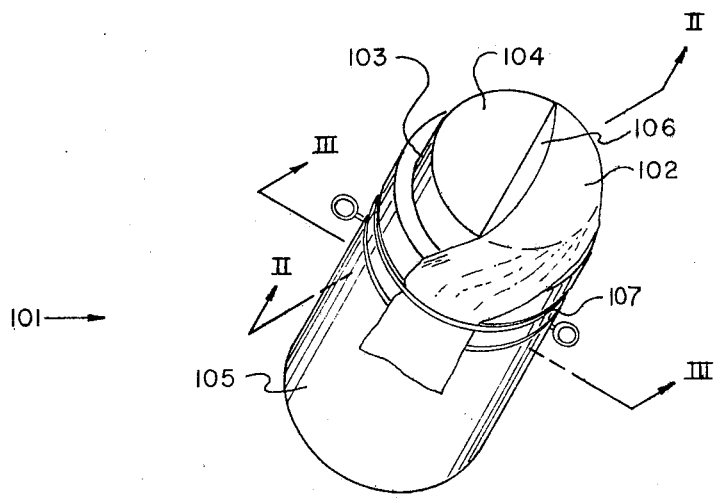
FIG. I
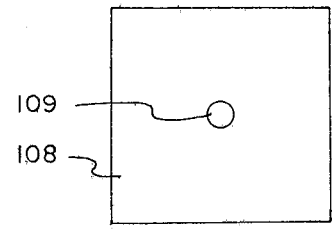
FIG. IV

GAME CALL

BACKGROUND OF THE INVENTION

1. Field of the Invention

This invention relates to a call for imitating sounds of various wild game, and in particular the sounds of turkeys, geese, wood ducks and predators.

2. Prior Art

Various game calls have been designed for imitating the sounds of wild game. Some require the rubbing of two objects together or turning of a crank. Others are constructed of an elastic piece stretched on a rigid support which is designed to be placed wholly in the mouth of the caller. Still other type calls have been designed.

However, all of these calls are not wholly satisfactory for various reasons, such as poor reproduction in the sound of the game being called, the sound produced is not projected with good reproduction over far distances, the game call is dangerous to the caller in that it can be swallowed, or operation of the call requires to much motion which can scare the game being called.

SUMMARY OF THE INVENTION

It is therefore an object of this invention to avoid these and other prior art problems.

Accordingly, a first hollow cyclindrical drum having one open end and one partially open end is fitted snugly into a second hollow cyclindrical drum constructed of a sound absorbant material and having both ends open. Across the partially open end is stretched a resilient membrane with the desired tautness to reproduce the sound of the game being called.

More particularly the first drum will be thin tubing (e.g., light gage tin tubing, copper tubing, plastic tubing, etc.) with one end hollow and the other end partially closed. The membrane is stretchable across the partially open end so as to leave open a small slit in the end. The first drum is then fitted into the second drum so that a portion of the drum with the membrane protrudes above the second drum. The second drum is of a length such that a portion extends beyond the open end of the first drum and constructed of a material that will absorb much of the high pitch sounds produced by the passage of air through the slit.

A preferred feature of this invention is the use within the hollow portion of the second drum of a removable absorbant material having a conical shape with the narrow end provided with an opening.

BRIEF DESCRIPTION OF THE DRAWINGS

FIG. 1 is a three dimensional view of a preferred caller design of this invention.

FIG. 2 is a cross-sectional view of FIG. 1 taken along lines II–III.

FIG. 3 is a cross sectional view of FIG. 1 taken along lines III—III.

FIG. 4 is a top view of the absorbant material that is placed within the second drum.

PREFERRED EMBODIMENTS OF THE INVENTION

As is seen in FIG. 1 the caller 101 comprises a flexible membrane stretched to the desired tautness and shape over the partially open end 104 of a first, thin cyclindrical drum 103. The first drum 103 fits snugly against and partially in a second drum 105, which extends below the first drum.

The call is operated by blowing across membrane 102 and through opening 106 which is formed by the membrane and the closed end portion 104 of the first drum. The passage of air through opening 106 results in sound being produced.

To achieve the desired pitch and resonance necessary to imitate the sound of the particular game (e.g., turkey, goose, etc.) being called it is preferred that the second cyclindrical drum 105 be constructed of a material which dampens out high pitch sounds. This is particularly necessary to achieve good sound imitation at distances greater than 100 yards when the amplitude of the high pitch sounds drowns out the deep resonance tones characteristic of most game such as turkeys, etc. Suitable material would include light woods having a porous fibrous structure. Particularly suitable woods include mahogany, walnut or douglas fir.

The amount of high pitched sound dampening needed depends not only on the type of membrane used, but also the material out of which the first drum is constructed. Once the parameters have been set control of the dampening can be achieved by varying the material used in the second drum, as well as, the length the second drum extends below the first drum.

As seen in FIG. II the two drums are preferable concentric to one another. This allows more uniform sound production at greater distances and dampening thus assuring greater consistency in calling.

The operation of the game call is more clearly seen by also referring to FIG. III. As stated hereinabove the membrane 102 is stretched across the upper, partially open end 104 of drum 103 whose other end is completely open. Drum 103 is then slipped into a second drum 105 and is preferable flush against the second drum. The second drum preferably has both ends completely open. In this manner the vibrations set up in the first drum by the passage of air across membrane 102 and through opening 106 are kept at small amplitudes. In the case where the first drum 103 is constructed of thin metal tubing the flush fit between the two drums inhibits the fomration of metallic (i.e,, high pitch) sounds. As is seen the second drum is thicker and extends below the first drum the distance necessary to achieve the desired pitch and resonance. As air passes between end portion 104 and membrane 102 a sound is produced which is characteristic of both the membrane and the end portion. Thus a variety of sounds having various frequencies, pitch and resonance are produced. Generally the first drum will be constructed of metal and the membrane of a rubber-like material. In the particular embodiment where the second drum 105 is open at both ends variance of the emitting sound is easily achieved by closing part of the open end extending below the first drum 103.

This can be done by the person using the call putting his fingers across the opening as he holds the game call. In cold, dry weather a preferred embodiment of this invention as seen in FIG. IV includes a sound absorbant material 108 having a hole 109 preferably in the center of material 108. To use the material it is inserted, as shown in FIG. III, into the hollow portion of the drums 103 and 105. Preferably it is inserted in conical form iwth the opening 109 being closest to opening 106.

Turning back to FIG. 1 membrane 102 is placed across the open portion of end 104 and temporarily secured in position by a rubber band being placed over membrane 102 forcing it into groove 107 cut into the second drum. If desired the membrane can then be permanently attached to the call by taping, etc. The purpose of this securing is to prevent gross slippage of the membrane on the call. To prevent minute membrane slippage across the partially open end, an adhesive surface is applied to the edges of drum 103 where contact is made with the membrane. Examples of suitable adhesives would include adhesive tape materials as well as certain paints. It is also possible the adhesive surface could be created by forming a rough surface for contacting the membrane. Other methods could also be applied as well as a combination of any of the above.

EXAMPLE 1

In accordance with this invention a game call was constructed wherein the first drum was constructed of a light gage tin having a diameter of about 1 ⅛ inch and a height of 1 ¾ inch. One end was completely open and the other end was half open. The second drum was constructed of one-eighth inch thick mahogany wood having an inside diameter of about 1 ⅛ inch insuring a flush fit with the first drum which was inserted into the second drum at a distance of 1 ⅝ inch resulting in the mahogany drum extending seven-eighths inch before the tin drum. The membrane was constructed of thin rubber and stretched across the open portion of the tine drum end in a manner to form a cresent-shaped opening.

The call as constructed above was then tested for accuracy in reproducing a turkey call. The pattern created on an oscilloscope screen by a real turkey was established. The call was then used and an almost identical pattern was recorded on the oscilloscope screen.

EXAMPLE 2

The call as constructed in Example 1 was then tested at distances of about 100 yards. Again reproducibility of the turkey sounds was established with a marked drop in the metallic sounds found in most similar prior art game calls.

Having described and illustrated my invention what I claim as new, novel, useful and non-obvious is:

1. A game call which comprises:
   a. a thin hollow, first drum having one end open and one end partially opened;
   b. a second hollow drum having open ends and an inside diameter large enough for said first drum to fit into, said open end of said first drum fitting snugly partially down into said second drum with a portion of said second drum protruding below said first drum and said partially opened end of said first drum extending out and beyond said second drum; said second drum having an inner surface forming said inside diameter constructed of sound absorbant material; and
   c. a resilient means which fits over said partially open end of said first drum to form an opening which air may pass through, said resilient means being held firmly in place by securing means attached to said call.

2. A game call according to claim 1 wherein said second drum comprises wood having a porous, fibrous structure.

3. A game call according to claim 2 wherein said wood is mahogany, walnut or douglas fir.

4. A game call according to claim 1 wherein said first drum is constructed of non-porous, only slightly sound absorbant material.

5. A game call according to claim 4 wherein said first drum material is a metal or plastic.

6. A game call according to claim 1 wherein said first drum material is a light gage tin and said second drum material is mahogany, and wherein said second drum extends about seven-eighths inches below said first drum.

* * * * *